United States Patent
Hoshikawa

(10) Patent No.: US 8,296,481 B2
(45) Date of Patent: Oct. 23, 2012

(54) DEVICE AND METHOD FOR IMPROVING TRANSFER EFFICIENCY OF ODD NUMBER OF DATA BLOCKS

(75) Inventor: Daisuke Hoshikawa, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 13/048,430

(22) Filed: Mar. 15, 2011

(65) Prior Publication Data

US 2011/0307637 A1 Dec. 15, 2011

(30) Foreign Application Priority Data

Jun. 9, 2010 (JP) ................................. 2010-131848

(51) Int. Cl.
*G06F 3/00* (2006.01)
*G06F 13/38* (2006.01)

(52) U.S. Cl. ................. 710/57; 710/52; 710/55

(58) Field of Classification Search .................. 710/1, 5, 710/22, 30, 33, 34, 35, 52, 55, 57
See application file for complete search history.

(56) References Cited

U.S. PATENT DOCUMENTS

| | | | |
|---|---|---|---|
| 5,640,602 | A | 6/1997 | Takase |
| 2003/0182477 | A1 | 9/2003 | Fukawa et al. |
| 2005/0160202 | A1 | 7/2005 | Fukawa et al. |

FOREIGN PATENT DOCUMENTS

| | | |
|---|---|---|
| JP | 7-334454 | 12/1995 |
| JP | 2003-281074 | 10/2003 |
| JP | 2007-334600 | 12/2007 |

OTHER PUBLICATIONS

Machine Translation of Japanese Patent Application Publication No. 2007-334600, titled Semiconductor Integrated Circuit Device, and published on Dec. 27, 2007.*

* cited by examiner

*Primary Examiner* — Chun-Kuan Lee
*Assistant Examiner* — Richard B Franklin
(74) *Attorney, Agent, or Firm* — Arent Fox LLP

(57) ABSTRACT

A data transfer device includes a data buffer, an odd number flag, and a control unit. The data buffer holds an even number of data blocks from a data transfer controller. The odd number flag is set when the number of data blocks to be transferred to a receiving device is odd. The control unit transfers an even number of data blocks to the receiving device for each data transfer cycle with respect to the receiving device, and transfers one data block to the receiving device in a last transfer cycle when the odd number flag is set. Thus, also when the data transfer controller which transfers data in a unit of an even number of data blocks is used, not only an even number of data blocks but an odd number of data blocks may be transferred to the receiving device.

6 Claims, 8 Drawing Sheets

DEVICE AND METHOD FOR IMPROVING TRANSFER EFFICIENCY OF ODD NUMBER OF DATA BLOCKS

CROSS-REFERENCE TO RELATED APPLICATION

This application is based upon and claims the benefit of priority of the prior Japanese Patent Application No. 2010-131848, filed on Jun. 9, 2010, the entire contents of which are incorporated herein by reference.

FIELD

The present embodiments relate to a data transfer device and a data transfer method.

BACKGROUND

In order to efficiently transfer an odd number of byte data by using a DMAC (Direct Memory Access Controller), an approach has been proposed in which only one byte among the last two-byte data is output to a transfer destination. This type of DMAC used in transfer of an odd number of byte data transfers an even or odd number of data to a data buffer in response to a transfer request. For example, related arts are discussed in Japanese Laid-open Patent Publication Nos. 2007-334600, 07-334454 and 2003-281074.

However, an approach has not been disclosed yet in which an odd number of byte data is transferred by using a DMAC capable of transferring only even number of byte data. In particular, in a data transfer device wherein only valid data is transferred from a DMAC capable of transferring only even number of byte data, an approach to transfer an odd number of byte data has not been disclosed yet.

SUMMARY

According to an aspect of the present embodiments, a data transfer device transferring data from a data transfer controller, which transfers data in a unit of an even number of data blocks, to a receiving device, the data transfer device includes a data buffer that holds an even number of data blocks from the data transfer controller, an odd number flag set when number of data blocks transferred to the receiving device is odd, and a control unit that transfers an even number of data blocks to the receiving device for each data transfer cycle with respect to the receiving device, and that transfers one data block to the receiving device in a last transfer cycle when the odd number flag is set.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

Hereinafter, embodiments will be described with reference to the accompanying drawings.

Figure 1:
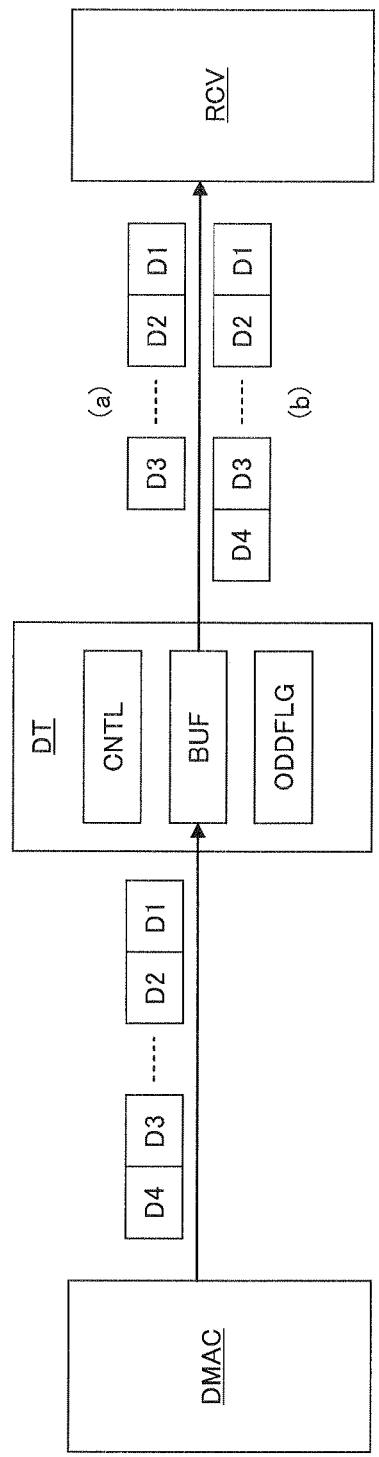
FIG. 1 illustrates an example of a data transfer device in one embodiment.

FIG. 1 illustrates an example of a data transfer device DT in one embodiment. The data transfer device DT receives data from a data transfer controller DMAC (Direct Memory Access Controller) which transfers an even number of data blocks D1-D2 (or D3-D4) as one transfer unit, and transfers the received data to a receiving device RCV. Note that, the data transfer controller is not limited to the DMAC, but may be another controller such as a CPU (Central Processing Unit).

The data transfer device DT includes a control unit CNTL, a data buffer BUF, and an odd number flag ODDFLG. Although the data transfer device DT is herein realized by using hardware, a part thereof may be realized using software.

The data buffer BUF sequentially receives and holds an even number of data blocks D1-D2, . . . , D3-D4 output from the data transfer controller DMAC, and outputs the held data blocks D1-D2, . . . , D3-D4 to the receiving device RCV in the order of reception. For example, each data block D1-D4 is one-byte data. Note that each data block D1-D4 may be two-byte data or four-byte data. The odd number flag ODDFLG indicates whether the number of data blocks to be transferred to the receiving device RCV is odd or even.

The control unit CNTL transfers an even number of data blocks (e.g., D1-D2) to the receiving device RCV for each transfer cycle except the last transfer cycle among the data transfer cycles with respect to the receiving device RCV. The control unit CNTL transfers one data block D3 to the receiving device RCV in the last transfer cycle when the odd number flag ODDFLG is currently set ((a) in FIG. 1). At this time, the remaining data block D4 is held in the data buffer BUF, and is transferred to the receiving device RCV in response to the next transfer request. Meanwhile, the control unit CNTL transfers an even number of data blocks to the receiving device RCV in the last transfer cycle when the odd number flag ODDFLG is currently reset ((b) in FIG. 1).

Thus, through the use of the odd number flag ODDFLG, also when the data transfer controller DMAC transferring data in the unit of an even number of data blocks is used, not only an even number of data blocks but an odd number of data blocks may be transferred to the receiving device RCV. In particular, in transfer of an odd number of data blocks, it is possible to prevent data, such as dummy data, which is not contained in a data block sequence, from being transferred to the receiving device RCV. As a result, only successive data blocks may be transferred to the receiving device RCV, and the transfer efficiency may be improved. Furthermore, because there is no need for dummy data cut-off processing and the like, the reception processing of the receiving device RCV may be simplified.

In addition, the data transfer device DT is realized using hardware, so that an odd number of data blocks may be efficiently transferred to the receiving device RCV without interposing software.

Figure 2:
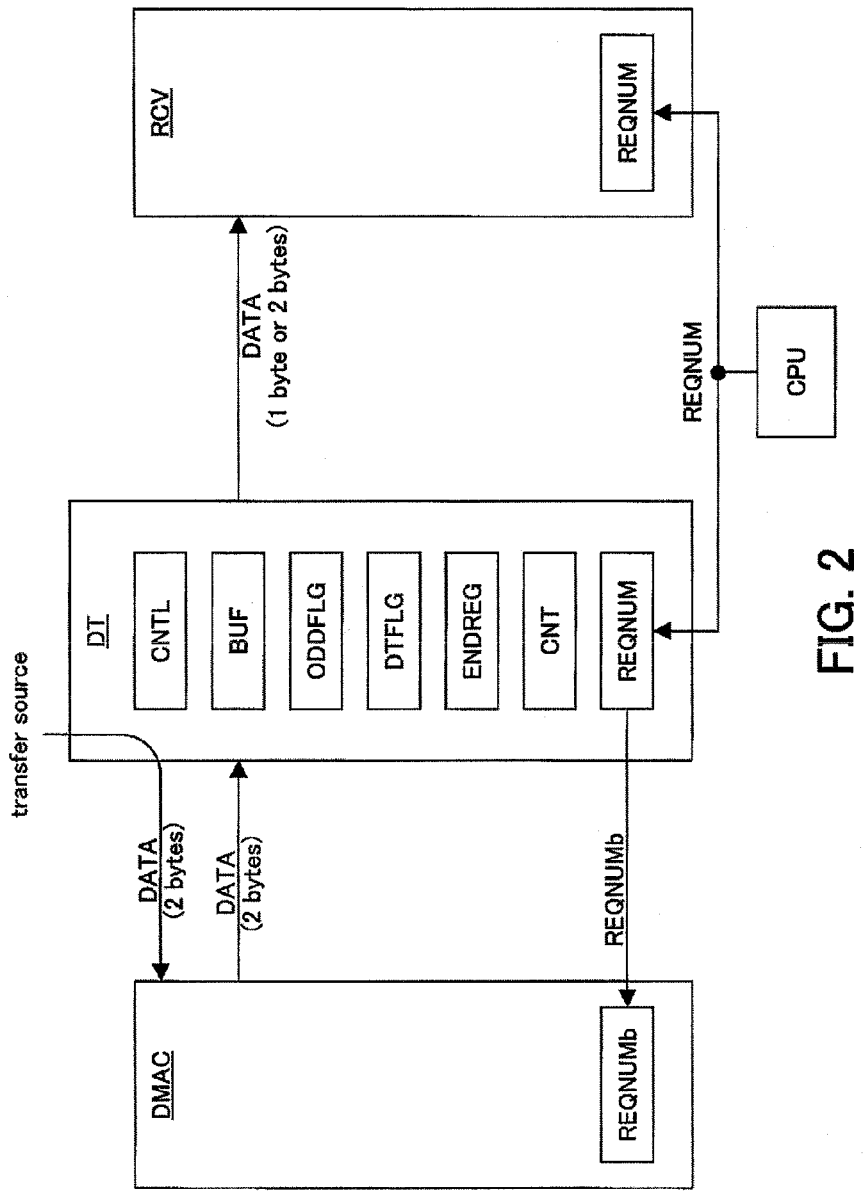
FIG. 2 illustrates an example of the data transfer device in another embodiment.

FIG. 2 illustrates an example of the data transfer device DT in another embodiment. Regarding the same element as the element in the embodiment described above, the same reference numeral is given, and the detailed description thereof is omitted. In this embodiment, the data transfer device DT includes the control unit CNTL, the data buffer BUF, the odd number flag ODDFLG, a data flag DTFLG, an endian register ENDREG, a counter CNT, and a transfer request number register REQNUM.

Figure 4:
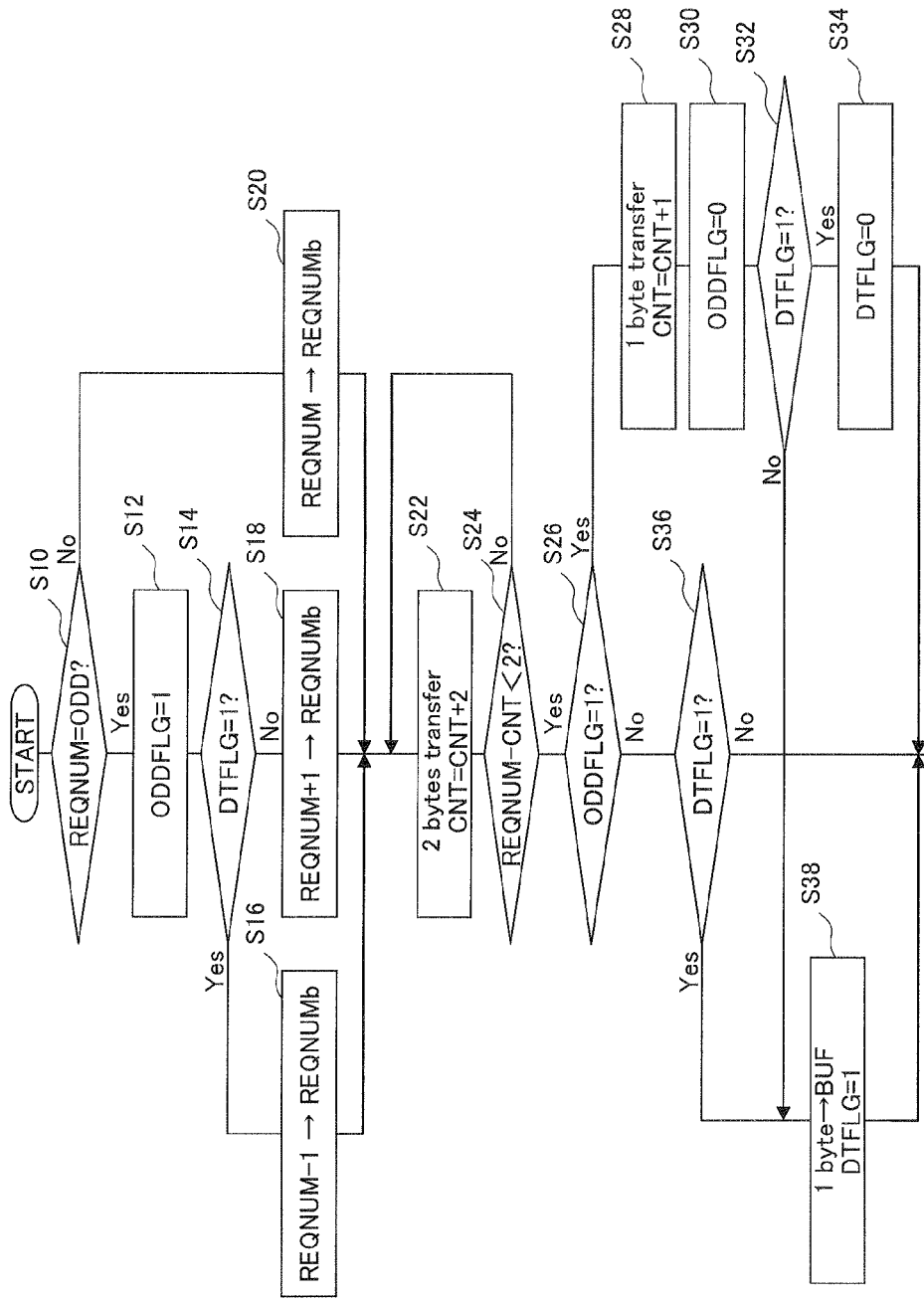
FIG. 4 illustrates an example of the operation of the data transfer device illustrated in FIG. 2.
Figure 5:
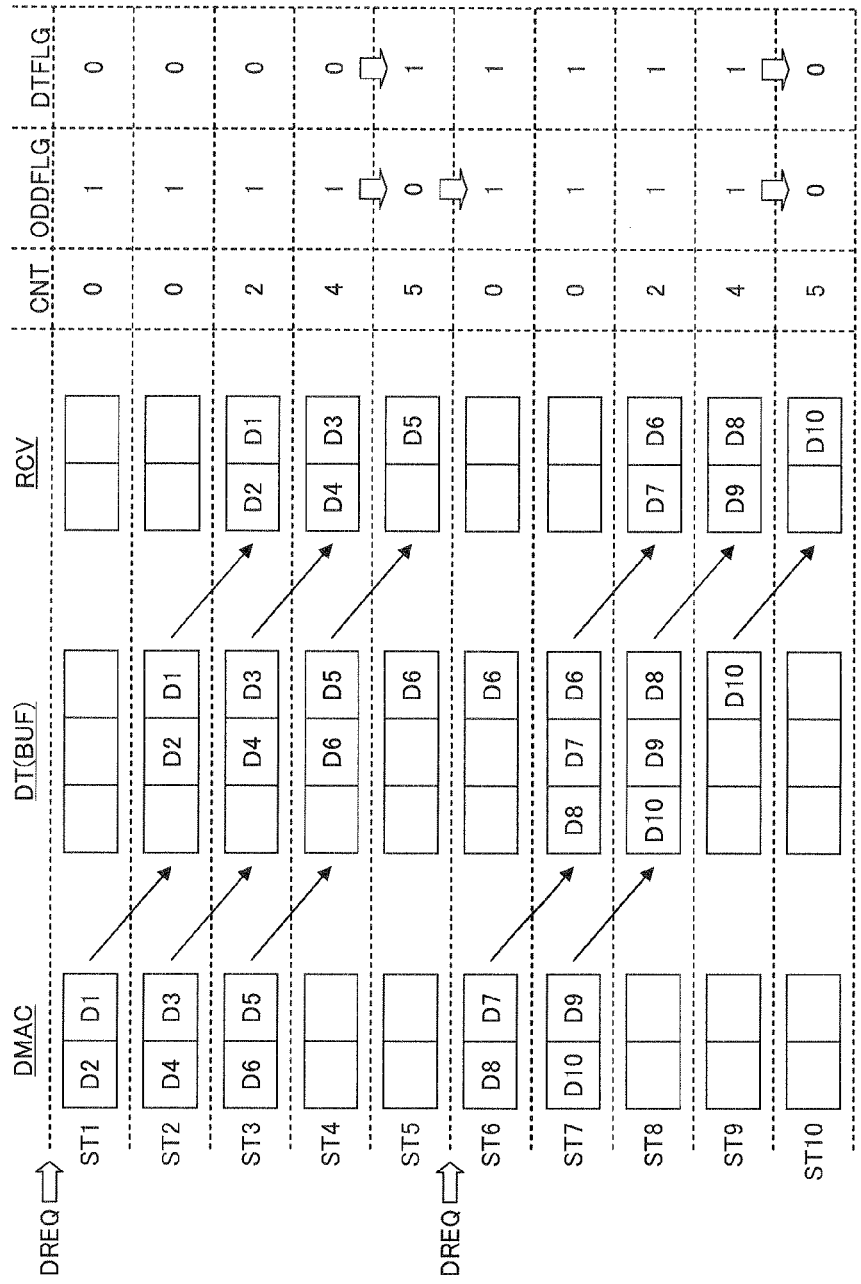
FIG. 5 illustrates an example of data which is transferred according to a flow illustrated in FIG. 4.

The control unit CNTL controls the data buffer BUF, the odd number flag ODDFLG, the data flag DTFLG, the endian register ENDREG, and the counter CNT and operates to realize a flow illustrated in FIG. 4. For example, the control unit CNTL transfers an even number of data blocks to the receiving device RCV for every plurality of transfer cycles which is performed in response to a transfer request DREQ, as illustrated in FIG. 5 or the like. However, when the odd number flag ODDFLG is currently set to "1", the control unit CNTL transfers one data block to the receiving device RCV in the last transfer cycle.

The data buffer BUF sequentially holds the data in the unit of two bytes output from the data transfer controller DMAC, and outputs the held data to the receiving device RCV in the unit of two bytes or in the unit of one byte. Then, the data transfer controller DMAC transfers data in the unit of an even number of data blocks (i.e., in the unit of two bytes).

The odd number flag ODDFLG is set to "1" when a byte number transferred to the receiving device RCV is odd, while when the byte number transferred to the receiving device RCV is even, it is reset to "0". The data flag DTFLG is set to "1" when there remains any data in the data buffer BUF after the transfer of data to the receiving device RCV, while when there remains no data in the data buffer BUF after the transfer of data to the receiving device RCV, it is reset to "0".

The endian register ENDREG holds an endian indicative of the storing order of the byte data. For example, information indicative of a little endian or a big endian is set in the endian register ENDREG. The counter CNT is reset for each transfer request DREQ, and counts the number of data blocks (the byte number in this example) having been transferred to the receiving device RCV. The transfer request number register REQNUM holds a data number transferred to the receiving device RCV, for each transfer request. For example, the transfer request number register REQNUM is set by a CPU illustrated in FIG. 3.

The data transfer controller DMAC operates as a bus master in response to a data transfer request (DREQ of FIG. 5) from a CPU or the like, and receives data from a transfer source and transfers the received data to the receiving device RCV via the data transfer device DT. The transfer request number register REQNUMb of the data transfer controller DMAC is set by the control unit CNTL of the data transfer device DT.

In this example, the data transfer controller DMAC may transfer data in the unit of two bytes. In other words, the data transfer controller DMAC may transfer only an even number of data blocks (an even number of bytes of data) when one byte which is the smallest transfer unit of data is set as one data block. Note that the data transfer controller DMAC may transfer data in the unit of four bytes. In the following description, the data transfer controller DMAC is simply referred to as the DMAC.

Figure 3:
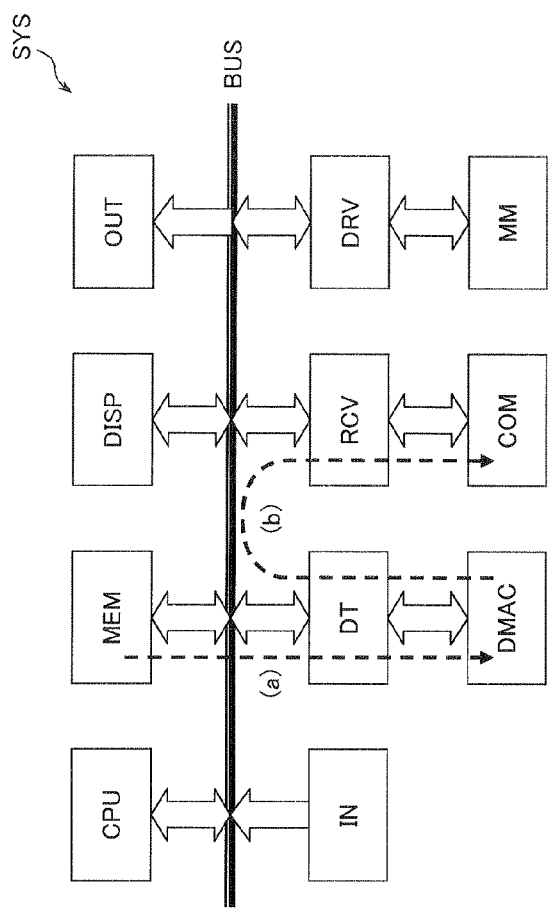
FIG. 3 illustrates an example of a system including the data transfer device illustrated in FIG. 2.

The receiving device RCV temporarily holds data, which is transferred via the DMAC, in order to output the data to a communication unit COM illustrated in FIG. 3. The receiving device RCV includes the same transfer request number register REQNUM as that of the data transfer device DT. For example, the transfer request number register REQNUM of the data transfer device DT and the transfer request number register REQNUM of the receiving device RCV are allocated to the same address space, and the same value is always set in these registers REQNUM.

FIG. 3 illustrates an example of a system SYS including the data transfer device DT illustrated in FIG. 2. For example, the system SYS is a personal computer, a mobile phone, or the like. The system SYS includes a CPU, a system bus BUS, a memory unit MEM, a display unit DISP, an output unit OUT, an input unit IN, the data transfer device DT, the DMAC, the receiving device RCV, the communication unit COM, a driver DRV, and memory media MM.

The CPU executes a program to thereby control the whole operation of the system SYS. The memory unit MEM includes a DRAM or a SRAM. For example, a program executed by the CPU is stored in a DRAM.

The display unit DISP is a liquid crystal display or the like. The output unit OUT is a speaker or the like. The input unit IN is a keyboard, a touch panel, or the like. The communication unit COM is a USB (Universal Serial Bus) interface or the like. The memory media MM are a hard disc, a memory card, and the like. The driver DRV is coupled to the system bus BUS in order to access the memory media MM.

For example, the DMAC reads image data from the memory unit MEM via the data transfer device DT ((a) in FIG. 3), and transfers the read image data to the communication unit COM via the data transfer device DT and receiving device RCV ((b) in FIG. 3).

FIG. 4 illustrates an example of the operation of the data transfer device DT illustrated in FIG. 2. The flow illustrated in FIG. 4 is performed by the control unit CNTL (hardware) of the data transfer device DT based on the data transfer request from the CPU. Note that a part of the flow illustrated in FIG. 4 may be performed by using software. The transfer operation of the DMAC based on the data transfer request from the CPU is performed in parallel with the flow illustrated in FIG. 4.

The CPU, when issuing the data transfer request, sets a transfer byte number indicative of the byte number transferred in the transfer request number register REQNUM of the data transfer device DT and in the transfer request number register REQNUM of the receiving device RCV. In the following description, the transfer byte number set in the transfer request number register REQNUM is referred to as the REQNUM. Moreover, the data transfer device DT, before starting data transfer, resets the odd number flag ODDFLG to "0" and resets the counter CNT to "0". Although the data flag DTFLG is currently set to "0" in the initial state, thereafter the data flag DTFLG holds the state after the last transfer.

First, in step S10, the data transfer device DT determines whether or not the REQNUM is odd. When the REQNUM is odd, the processing moves to step S12. When the REQNUM is not odd, i.e., even, the processing moves to step S20.

In step S12, the data transfer device DT sets the odd number flag ODDFLG to "1". Next, in step S14, the data transfer device DT determines whether or not the data flag DTFLG is currently set to "1". When the data flag DTFLG is currently set to "1" i.e., when data which has not been transferred to the receiving device RCV remains in the data buffer BUF, the processing moves to step S16. When the data flag DTFLG is currently reset to "0", i.e., when the data buffer BUF is empty, the processing moves to step S18.

In step S16, the data transfer device DT sets a value, which is determined by subtracting "1" from the value stored in the transfer request number register REQNUM, in the transfer request number register REQNUMb of the DMAC. In step S18, the data transfer device DT sets a value, which is obtained by adding "1" to the value stored in the transfer request number register REQNUM, in the transfer request number register REQNUMb of the DMAC. In step S20, the data transfer device DT sets the value, which is stored in the transfer request number register REQNUM, in the transfer request number register REQNUMb of the DMAC. Subsequently, the processing moves to step S22.

In step S22, the data transfer device DT transfers the oldest two-byte data among the data, which have been transferred from the DMAC and have been held in the data buffer BUF, to the receiving device RCV. Then, the data transfer device DT adds "2" to the counter value CNT. Next, in step S24, the data transfer device DT determines whether or not a value (i.e., the remaining transfer byte number), which is obtained by subtracting the counter value CNT from the value of the transfer request number register REQNUM, is less than "2". When the remaining transfer byte number is equal to or greater than "2", the processing returns to step S22 in order to further perform the two-byte transfer. When the remaining transfer byte number is less than "2", i.e., "1" or "0", the processing moves to step S26.

In step S26, the data transfer device DT determines whether or not the odd number flag ODDFLG is currently set to "1". When the odd number flag ODDFLG is currently set to "1", the data transfer device DT determines that there remains one-byte data to be transferred to the data buffer BUF, and moves the processing to step S28. When the odd number flag ODDFLG is currently set to "0", the data transfer device DT determines that there remains no data to be transferred to the data buffer BUF, and moves the processing to step S36.

In step S28, the data transfer device DT transfers one-byte data held in the data buffer BUF to the receiving device RCV, and adds "1" to the counter value CNT. Next, in step S30, the data transfer device DT resets the odd number flag ODDFLG to "0".

Next, in step S32, the data transfer device DT determines whether or not the data flag DTFLG is currently set to "1". When the data flag DTFLG is currently set to "1", the data transfer device DT determines that one-byte data, which had remained in the data buffer BUF, has been transferred to the receiving device RCV, in step S28, and moves the processing to step S34. Meanwhile, when the data flag DTFLG is currently reset to "0", the data transfer device DT determines that one-byte data among the two-byte data is left in the data buffer BUF by the one-byte transfer of step S28, and moves the processing to step S38. In step S34, because the data buffer BUF has been emptied by the one-byte transfer of step S28, the data transfer device DT resets the data flag DTFLG to "0" and completes the transfer processing.

Meanwhile, in step S36, when the data flag DTFLG is currently set to "1", the data transfer device DT determines that there remains data, which has not been transferred to the receiving device RCV, in the data buffer BUF after the even-byte transfer, and moves the processing to step S38. When the data flag DTFLG is currently reset to "0", the data transfer device DT determines that the data buffer BUF is empty after the even-byte transfer, and completes the transfer processing.

In step S38, because there remains one-byte data, which has not been transferred to the receiving device RCV, in the data buffer BUF, the data transfer device DT sets the data flag DTFLG to "1". Then, the transfer processing is completed.

FIG. 5 illustrates an example of data which is transferred according to the flow illustrated in FIG. 4. In FIG. 5, each rectangular frame illustrated in the DMAC, data transfer device DT, and receiving device RCV indicates a buffer or register in which data is temporarily held. Each D1-D10 in the rectangular frame indicates byte data (i.e., data block) to be transferred, and the number thereof indicates the sequence of data to be transferred. For simplicity of description, FIG. 5 illustrates an example in which the transfer request DREQ of the DMA is issued twice by the CPU and the transfer of five (odd number) bytes of data to the receiving device RCV is performed twice. Each of states ST1-ST10 indicates the transfer cycle of at least any one of the DMAC, data transfer device DT, and receiving device RCV.

When the first transfer request DREQ has been issued, the odd number flag ODDFLG is set to "1" indicative of the transfer of an odd number of data according to steps S10, S12 illustrated in FIG. 4. Before the first data is transferred, the counter value CNT is reset to "0". In the initial state, the data flag DTFLG is currently reset to "0" because the data buffer BUF of the data transfer device DT is empty. For this reason, according to step S18 illustrated in FIG. 4, the data transfer device DT sets the transfer byte number (REQNUMb) of the DMAC to "6", which is obtained by adding "1" to a requested transfer byte number "5".

First, in a state ST1, the DMAC outputs the first two byte data D1-D2, which are read from the memory unit MEM or the like, to the data transfer device DT. Next, in a state ST2, the DMAC outputs the next two byte data D3-D4, which are read from the memory unit MEM or the like, to the data transfer device DT. The data transfer device DT writes the data D1-D2 from the DMAC into the data buffer BUF, and outputs the data D1-D2 to the receiving device RCV.

Next, in a state ST3, the DMAC outputs two byte data D5-D6, which are read from the memory unit MEM or the like, to the data transfer device DT. The data transfer device DT writes the data D3-D4 from the DMAC into the data buffer BUF, and outputs the data D3-D4 to the receiving device RCV. The receiving device RCV temporarily holds the data D1-D2 from the data transfer device DT in a register or the like. The data transfer device DT changes the counter value CNT to "2" according to step S22 illustrated in FIG. 4 in response to the completion of the transfer of the data D1-D2.

In a state ST4, the data transfer device DT writes the data D5-D6 from the DMAC into data buffer BUF, and outputs the data D5-D6 to the receiving device RCV. The receiving device RCV temporarily holds the data D3-D4 from the data transfer device DT in a register or the like. The data transfer device DT changes the counter value CNT to "4" in response to the completion of the transfer of the data D3-D4. Thus, because the remaining transfer byte number becomes "1", the processing illustrated in FIG. 4 moves to step S28 through steps S24, S26.

In a state ST5, the data transfer device DT performs the one-byte transfer according to step S28, and changes the counter value CNT to "5". The data transfer device DT resets the odd number flag ODDFLG to "0" in response to the completion of the data transfer of five bytes according to step S30 illustrated in FIG. 4. Because the data flag DTFLG is "0", the processing illustrated in FIG. 4 moves to step S38. Because there remains one-byte data D6, which has not been transferred to the receiving device RCV, in the data buffer BUF after completion of the data transfer of five bytes, the data transfer device DT sets the data flag DTFLG to "1".

Subsequently, when the next transfer request DREQ is issued, the data transfer device DT resets the counter value CNT to "0", and sets the odd number flag ODDFLG to "1" again according to step S12. Because there remains one-byte data D6 in the data buffer BUF, the processing moves to step S16. The data transfer device DT sets the transfer byte number (REQNUMb) of the DMAC to "4", which is obtained by subtracting "1" from the transfer byte number "5".

In a state ST6, as in the state ST1, two byte data D7-D8 are output to the data transfer device DT from the DMAC. Next, in a state ST7, the DMAC outputs the next data D9-D10 to the data transfer device DT, and completes the data transfer of four bytes. The data transfer device DT generates two-byte data by combining the already held data D6 and the data D7, which is a part of the new data D7-D8 from the DMAC, and outputs the generated two-byte data to the receiving device RCV.

Next, in a state ST8, the data transfer device DT generates two-byte data by combining the already held data D8 and the data D9 from the DMAC, and outputs the generated two-byte data to the receiving device RCV. The receiving device RCV temporarily holds the data D6-D7 from the data transfer device DT in a register or the like. The data transfer device DT changes the counter value CNT to "2" in response to the completion of the transfer of the data D6-D7.

In a state ST9, the data transfer device DT outputs the last byte data D10 to the receiving device RCV. The receiving device RCV holds the data D8-D9 from the data transfer device DT in a register or the like. The data transfer device DT changes the counter value CNT to "4" in response to the completion of the transfer of the data D8-D9. Because the remaining transfer byte number thus becomes "1", the processing illustrated in FIG. 4 moves to step S28 through steps S24 and S26.

In a state ST10, the data transfer device DT performs one-byte transfer according to step S28, and changes the counter value CNT to "5". The data transfer device DT resets the odd number flag ODDFLG to "0" in response to the completion of the data transfer of five bytes according to step S30. Because the data flag DTFLG is "1", the processing illustrated in FIG. 4 moves to step S34, and the data transfer device DT resets the data flag DTFLG to "0" indicating that there remains no data in the data buffer BUF. Then, the transfer of 10 byte data associated with two transfer requests DREQ is completed.

In this manner, also when the transfer by the DMAC is limited to an even number of bytes, the data held in the data buffer BUF is recognized by using the odd number flag ODDFLG and data flag DTFLG, and the transfer operation is controlled, so that an odd number of byte data may be transferred to the receiving device RCV.

Figure 6:
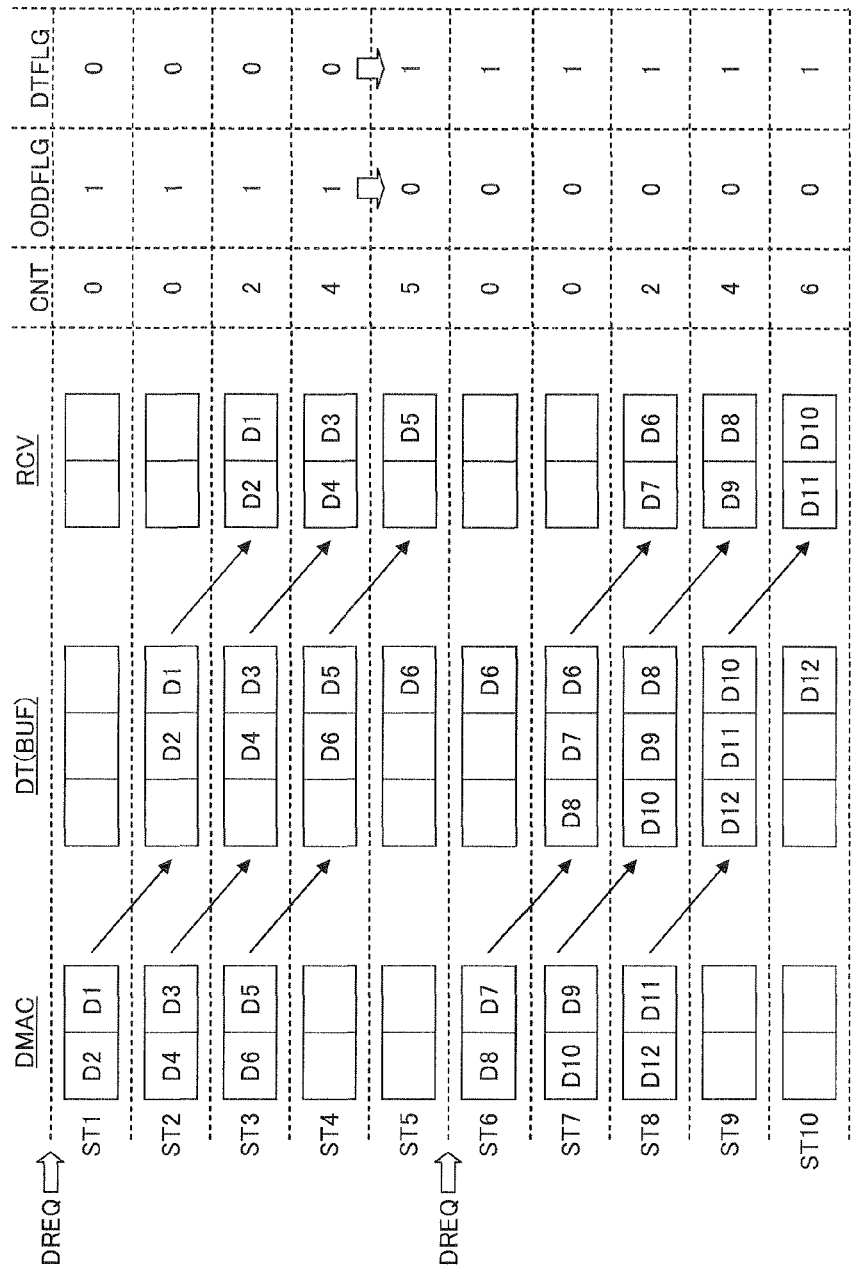
FIG. 6 illustrates another example of data which is transferred according to the flow illustrated in FIG. 4.

FIG. 6 illustrates another example of data which is transferred according to the flow illustrated in FIG. 4. Regarding the same operation as that of FIG. 5, the detailed description is omitted. In this example, after the transfer of five bytes (an odd number of bytes), the transfer of six bytes (an even number of bytes) is performed. The operations of the states ST1-ST5 are the same as those of the states ST1-ST5 of FIG. 5.

The CPU sets the transfer byte number (=6) to the respective transfer request number registers REQNUM of the data transfer device DT and receiving device RCV when issuing the second transfer request DREQ. The data transfer device DT resets the counter value CNT to "0", and resets the odd number flag ODDFLG to "0" because the transfer byte number is even. Because the transfer byte number is even, the processing illustrated in FIG. 4 moves to step S20 through step S10. Then, the data transfer device DT sets the transfer byte number (=6) held in the transfer request number register REQNUM to the transfer request number register of the DMAC.

The operations of the states ST6-ST7 are the same as those of the states ST6-ST7 of FIG. 5 except that the value of the odd number flag ODDFLG differs. In the state ST8, the DMAC outputs the next data D11-D12 to the data transfer device DT, and completes the transfer of six byte data. The data transfer device DT outputs the already held data D8-D9 to the receiving device RCV. The receiving device RCV temporarily holds the data D6-D7 from the data transfer device DT in a register or the like. The data transfer device DT changes the counter value CNT to "2" in response to the completion of the transfer of the data D6-D7.

Next, in the state ST9, the data transfer device DT outputs the data D8-D9 to the receiving device RCV. The receiving device RCV temporarily holds the data D8-D9 from the data transfer device DT in a register or the like. The data transfer device DT changes the counter value CNT to "4" in response to the completion of the transfer of the data D8-D9.

In the state ST10, the receiving device RCV temporarily holds data D10-D11 from the data transfer device DT in a register or the like. The data transfer device DT changes the counter value CNT to "6" in response to the completion of the transfer of the data D10-D11. Thus, the remaining transfer byte number becomes "0". Because the odd number flag ODDFLG holds "0" and the data flag DTFLG holds "1", the processing illustrated in FIG. 4 moves to step S38 through steps S24, S26 and S36. After transfer of the six byte data is completed, there remains one-byte data D12, which has not been transferred to the receiving device RCV, in the data buffer BUF. For this reason, the data transfer device DT sets the data flag DTFLG to "1". Then, the transfer of 11 byte data associated with two transfer requests DREQ is completed.

In this manner, also when the transfer by the DMAC is limited to an even number of bytes and the even number of bytes and odd number of bytes are mixed, and these data are transferred to the receiving device RCV, these data may be reliably transferred to the receiving device RCV by controlling the transfer operation through the use of the odd number flag ODDFLG and data flag DTFLG.

Figure 7:
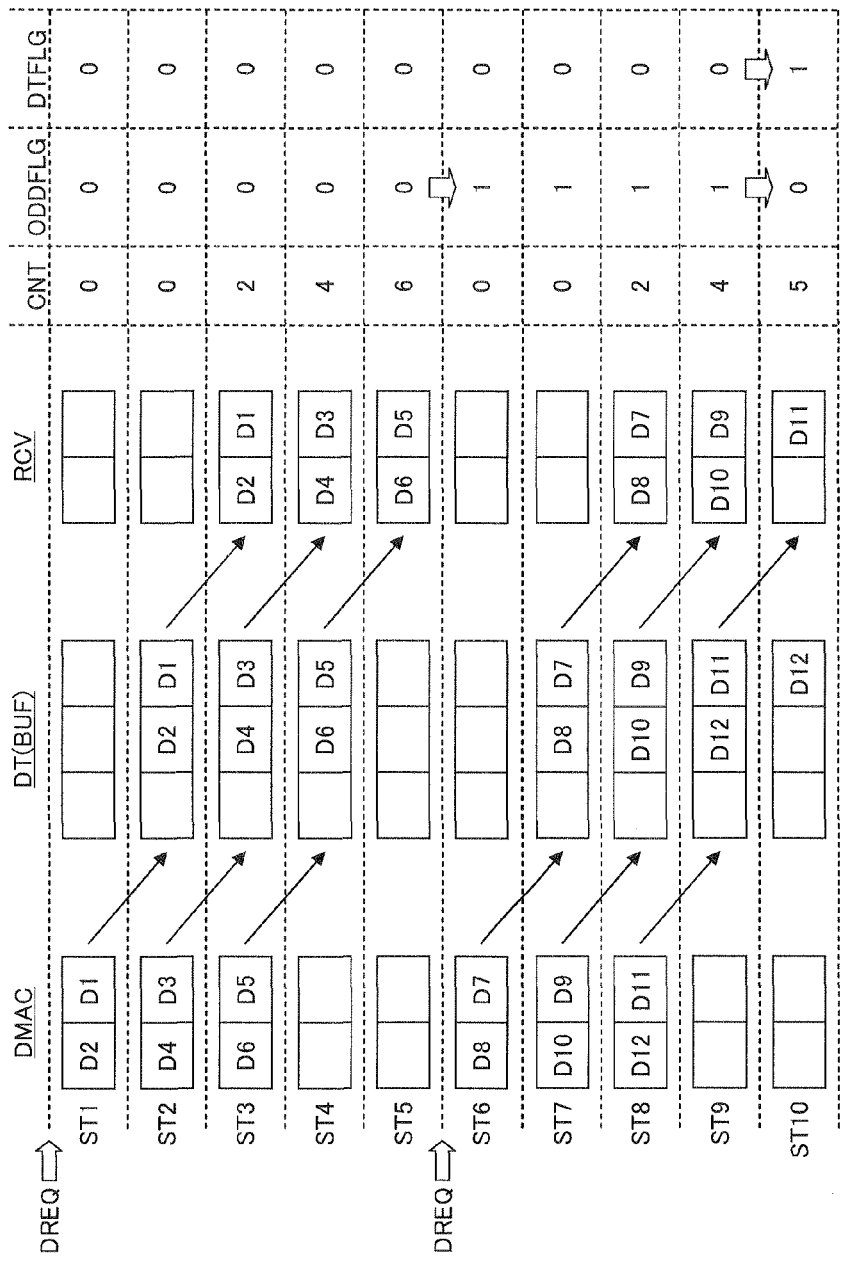
FIG. 7 illustrates another example of data which is transferred according to the flow illustrated in FIG. 4.

FIG. 7 illustrates another example of data which is transferred according to the flow illustrated in FIG. 4. Regarding the same operation as that of FIG. 5 and FIG. 6, the detailed description is omitted. In this example, after the transfer of six bytes (an even number of bytes), the transfer of five bytes (an odd number of bytes) is performed. The operations of the states ST1-ST4 are the same as those of the states ST1-ST4 of FIG. 5 except that the odd number flag ODDFLG is "0".

In the state ST5, the receiving device RCV temporarily holds the data D5-D6 from the data transfer device DT in a register or the like. The data transfer device DT changes the counter value CNT to "6" in response to the completion of the transfer of the data D5-D6. Thus, the remaining transfer byte number becomes "0". The odd number flag ODDFLG holds "0" and the data flag DTFLG holds "0". For this reason, the processing illustrated in FIG. 4 is completed through steps S24, S26 and S36. The states ST6-ST10 corresponding to the second transfer request DREQ are the same as the states ST1-ST5 illustrated in FIG. 5 except that the data transferred differs.

Figure 8:
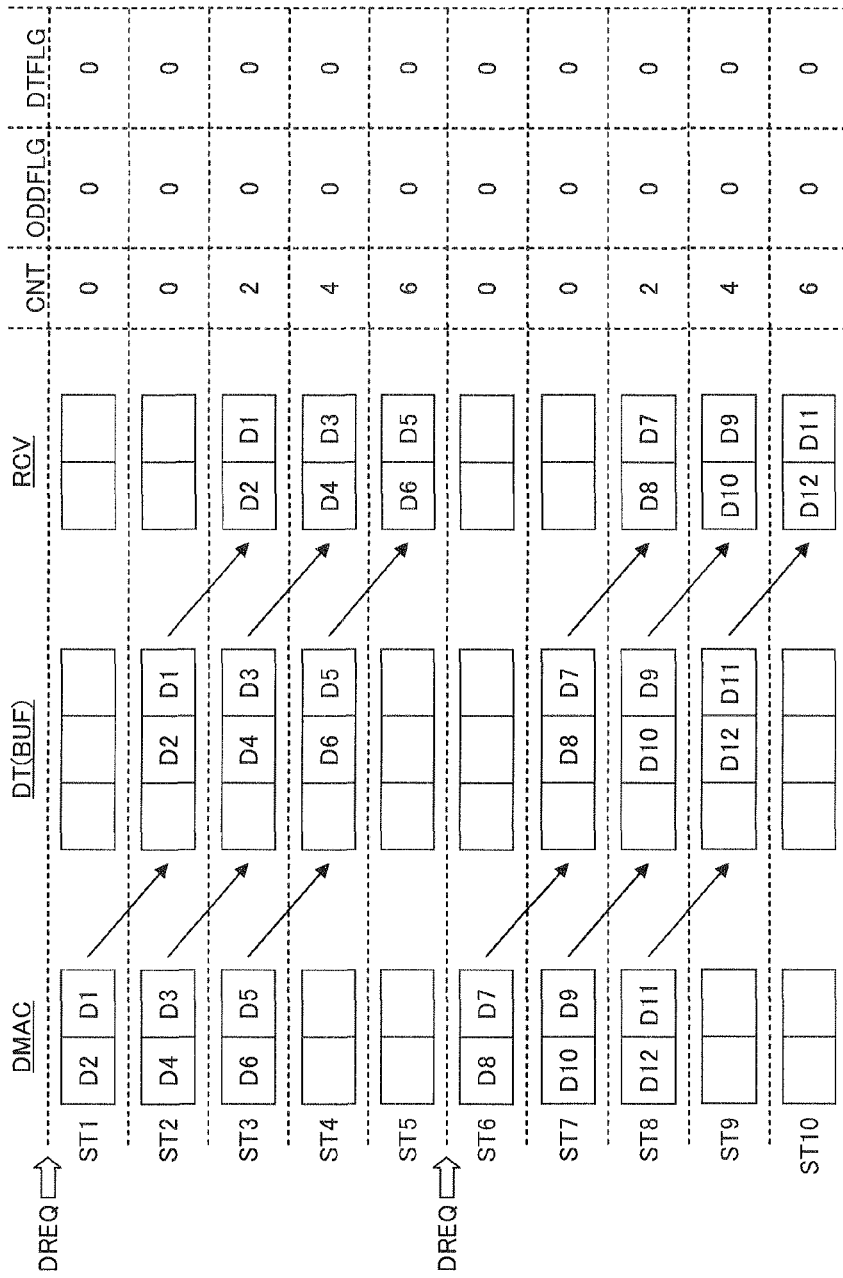
FIG. 8 illustrates another example of data which is transferred according to the flow illustrated in FIG. 4.

FIG. 8 illustrates another example of data which is transferred according to the flow illustrated in FIG. 4. Regarding the same operation as that of FIG. 5 and FIG. 6, the detailed description is omitted. In this example, the transfer of six bytes (an even number of bytes) is performed twice. The operations of the states ST1-ST5 are the same as the operations of the states ST1-ST5 of FIG. 7. The operations of the states ST6-S10 are the same as the operations of the states ST6-ST10 of FIG. 7, excepting that the data D12 is transferred from the data transfer device DT to the receiving device RCV.

As described above, also in this embodiment, the same effect as that of the above-described embodiments may be obtained. Furthermore, through the use of the data flag DTFLG indicating whether or not there remains any data in the data buffer BUF after data transfer, two-byte data obtained by combining the byte data held in the data buffer BUF and the byte data newly transferred from the DMAC may be transferred to the receiving device RCV. Moreover, through the use of the data flag DTFLG, the number of byte data transferred to the buffer circuit BUF from the DMAC may be optimally adjusted. That is, the value set in the transfer request number register REQNUMb of the DMAC may be optimally adjusted. From the above, also when using the DMAC with an even number of byte data as the transfer unit, the minimum amount of data may be always held in the buffer circuit BUF and the transfer of an odd number of byte data to the receiving device RCV may be reliably performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transfer device transferring data from a data transfer controller, which transfers data in a unit of an even number of data blocks, to a receiving device, the data transfer device comprising:
   a data buffer that holds one or more data blocks from the data transfer controller;
   an odd number flag set when number of data blocks transferred to the receiving device is odd;
   a data flag indicating whether or not one of the data blocks is held in the data buffer; and
   a control unit that transfers an even number of data blocks to the receiving device for each data transfer cycle, that transfers one data block to the receiving device in a last transfer cycle when the odd number flag is set, that sets the data flag when one of the data blocks remains in the data buffer after the last transfer cycle, and that resets the data flag when the data buffer is empty after the last transfer cycle.

2. The data transfer device according to claim 1, wherein when the data flag is set, the control unit transfers an even number of data blocks, which are formed by a data block remaining in the data buffer and at least one of an even number of data blocks from the data transfer controller, to the receiving device for each transfer cycle.

3. The data transfer device according to claim 1, further comprising
   a first register in which number of data blocks to be transferred to the receiving device is set, wherein:
   when the odd number flag is set and the data flag is reset, the control unit sets a number, which is larger than the number set in the first register by one, in a second register of the data transfer controller; and
   when the odd number flag is set and the data flag is set, the control unit sets a number, which is smaller than the number set in the first register by one, in the second register of the data transfer controller.

4. A data transfer method for transferring data from a data transfer controller, which transfers data in a unit of an even number of data blocks, to a receiving device, the data transfer method comprising:
   holding one or more data blocks from the data transfer controller in a data buffer;
   writing a value, which indicates whether number of data blocks transferred to the receiving device is odd or even, to an odd number flag;
   writing a value, which indicates whether or not one of the data blocks is held in the data buffer, to a data flag;
   transferring an even number of data blocks to the receiving device for each data transfer cycle, and transferring one data block to the receiving device in a last transfer cycle when the odd number flag is set; and
   setting the data flag when one of the data blocks remains in the data buffer after the last transfer cycle, and resetting the data flag when the data buffer is empty after the last transfer cycle.

5. The data transfer method according to claim 4, further comprising
   when the data flag is set, transferring an even number of data blocks, which are formed by a data block remaining in the data buffer and at least one of an even number of data blocks from the data transfer controller, to the receiving device for each transfer cycle.

6. The data transfer method according to claim 4, further comprising:
   setting number of data blocks to be transferred to the receiving device in a first register;
   when the odd number flag is set and the data flag is reset, setting a number, which is larger than the number set in the first register by one, in a second register of the data transfer controller; and
   when the odd number flag is set and the data flag is set, setting a number, which is smaller than the number set in the first register by one, in the second register of the data transfer controller.

* * * * *